US009902836B2

(12) United States Patent
Corveleyn et al.

(10) Patent No.: US 9,902,836 B2
(45) Date of Patent: Feb. 27, 2018

(54) FLUOROPOLYETHER ELASTOMER COMPOSITIONS HAVING LOW GLASS TRANSITION TEMPERATURES

(75) Inventors: Steven G. Corveleyn, Knokke-Heist (BE); Miguel A. Guerra, Woodbury, MN (US); Rudolf J. Dams, Antwerp (BE); Tom Opstal, Laarne (BE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 607 days.

(21) Appl. No.: 14/009,929

(22) PCT Filed: Mar. 13, 2012

(86) PCT No.: PCT/US2012/028850
§ 371 (c)(1),
(2), (4) Date: Nov. 6, 2013

(87) PCT Pub. No.: WO2012/138457
PCT Pub. Date: Oct. 11, 2012

(65) Prior Publication Data
US 2014/0066572 A1  Mar. 6, 2014

Related U.S. Application Data

(60) Provisional application No. 61/472,376, filed on Apr. 6, 2011.

(51) Int. Cl.
C08K 5/14  (2006.01)
C08K 5/06  (2006.01)
C08G 65/00  (2006.01)
C08L 71/00  (2006.01)

(52) U.S. Cl.
CPC ............. *C08K 5/14* (2013.01); *C08G 65/007* (2013.01); *C08L 71/00* (2013.01); *C08G 2650/48* (2013.01)

(58) Field of Classification Search
USPC ............................................ 525/50; 524/366
See application file for complete search history.

(56) References Cited

U.S. PATENT DOCUMENTS

| | | | |
|---|---|---|---|
| 3,125,599 A | 3/1964 | Warnell | |
| 3,250,808 A | 5/1966 | Moore, Jr. et al. | |
| 3,392,097 A | 7/1968 | Gozzo et al. | |
| 3,646,085 A | 2/1972 | Bartlett | |
| 3,699,145 A | 10/1972 | Sianesi et al. | |
| 3,810,874 A | 5/1974 | Zollinger et al. | |
| 4,647,413 A * | 3/1987 | Savu | C07C 59/315 528/402 |
| 4,946,936 A | 8/1990 | Moggi et al. | |
| 5,155,282 A * | 10/1992 | Marchionni | C08G 65/005 525/326.4 |
| 5,288,376 A | 2/1994 | Oyama et al. | |
| 5,314,958 A | 5/1994 | Himori et al. | |
| 5,453,549 A | 9/1995 | Koike et al. | |
| 5,545,693 A * | 8/1996 | Hung | C08L 27/12 524/208 |
| 5,789,489 A * | 8/1998 | Coughlin | C08F 214/262 525/326.3 |
| 6,160,051 A | 12/2000 | Tatsu et al. | |
| 6,716,534 B2 * | 4/2004 | Moore | C08G 65/007 427/387 |
| 2006/0287559 A1 | 12/2006 | Friesen et al. | |
| 2011/0294944 A1 * | 12/2011 | Manzoni | C08F 214/262 524/546 |
| 2012/0108756 A1 | 5/2012 | Komatsu et al. | |
| 2013/0109797 A1 * | 5/2013 | Fantoni | C08K 5/06 524/366 |

FOREIGN PATENT DOCUMENTS

| | | |
|---|---|---|
| EP | 0 222 201 A1 | 5/1987 |
| EP | 222201 A1 * | 5/1987 |
| EP | 0 803 526 A2 | 10/1997 |
| EP | 0 964 018 A2 | 12/1999 |
| EP | 964018 A2 * | 12/1999 |
| EP | 1 829 905 A1 | 1/2001 |
| JP | H01-193349 A | 8/1989 |
| WO | WO 92/12199 A1 | 7/1992 |

OTHER PUBLICATIONS

Wlassics, I., et al. "Synthesis of α, ω Perfluoroployether iodides" Journal of Fluorine Chemistry, vol. 126, No. 1 (2005), pp. 45-51.

* cited by examiner

*Primary Examiner* — Mark Kaucher
*Assistant Examiner* — Henry Hu
(74) *Attorney, Agent, or Firm* — Thomas M. Spielbauer

(57) ABSTRACT

A curable composition is provided. The curable composition has at least one functionalized fluoropolyether and at least one radical curing system. Further provided are fluoroelastomer compositions having a glass transition temperature of less than −40° C. and shaped articles comprising fluoroelastomers having glass transition temperatures of less than −40° C. obtained by curing the curable compositions. Also described are methods of making fluoroelastomer compositions having glass transition temperatures of less than −40° C.

10 Claims, No Drawings

US 9,902,836 B2

FLUOROPOLYETHER ELASTOMER COMPOSITIONS HAVING LOW GLASS TRANSITION TEMPERATURES

FIELD

The present disclosure relates to radically curable fluoropolyether compositions for making fluorinated elastomers having low glass transition temperatures, fluorinated polyether elastomers having low glass transitions temperatures, methods of making them and to articles containing them.

BACKGROUND

Fluoroelastomers are widely used in the industry because they retain their elastomeric properties over a wide temperature range and have high resistance to heat, chemicals and fuels. For example, fluoroelastomers are used in the automotive or aircraft industry where resistance to fuel is desired. They also find application in chemical processing and in oil and gas applications. In many applications, it is desirable that the fluoroelastomers remain their elastomeric properties at very low temperatures. In some applications materials have to exposed to temperatures below $-40°$ C. or even below $-100°$ C. for an extended period of time.

Fluoroelastomers of high chemical and temperature resistance and good mechanical properties may be prepared by curing a system comprising copolymers of vinylidene fluoride and/or tetrafluoroethylene with perfluorovinyl ethers and cure site monomers as described for example in European Patent Number 1 829 905 B1. Materials having a glass transition temperatures of about $-30°$ C. are described in EP 1 829 905. However, perfluorovinyl ether monomers are rather expensive materials.

A different approach is described in U.S. Pat. No. 6,160,051. Fluoroelastomers with low glass transition temperatures (TR-10 temperatures in the range of as low as $-40°$ C.) were obtained by copolymerizing vinylidenefluoride in the presence of another fluorinated monomers, cure-site monomers and further in the presence of a diiodoperfluoropolyether to form a block-copolymer. The resulting block-copolymer was cured to provide a low temperature fluoroelastomer.

SUMMARY

In the following there is provided a curable composition comprising
a) at least one functionalized fluoropolyether having a molecular weight from about 400 g/mole and up to about 25,000 g/mole and containing moieties selected from ($-C_4F_8O-$), ($-C_3F_6O-$), ($-C_2F_4O-$), ($-CF_2O-$) or combinations thereof and wherein the fluoropolyether is functionalised to containing at a terminal position or at a position that is adjacent to the terminal position at least one functional group that is reactive to a radical curing system in a radical curing reaction, and
b) at least one radical curing system comprising at least one radical generating compound.

In another aspect there is provided a composition comprising a cured fluoroelastomer obtained by curing the curable composition described above.

In yet another aspect there is provided a method of making a composition comprising a fluoroelastomer having a glass transition temperature of less than $-40°$ C., said method comprising i. providing a curable composition as described above and
ii. subjecting the curable composition to a radical curing reaction.

In a further aspect there is provided a shaped article obtained by injection or compression molding the curable composition curable composition described above.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items. The term "consisting essentially of" has a meaning as defined in the description below.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Fluoroelastomers suitable for low temperature applications have glass transitions temperatures close to or below such low application temperatures, because the polymer phase below the glass transition temperature ensures the flexibility or elastomeric properties of the polymer. Therefore, there is a desire to provide fluoroelastomers having glass transition temperatures below $-40°$ C. or of $-120°$ C. or less.

It has now been found that fluoroelastomers having glass transition temperatures of less than $-40°$ C. can be prepared by cross-linking functionalized perfluoropolyethers in a radical curing system to generate perfluoropolyether elastomers. The perfluoropolyether elastomers are suitable for the fabrication of shaped articles, for example seals, for low temperature applications.

In the following there are provided curable fluoropolymer compositions that can be cured to make compositions comprising fluoroelastomers. Such fluoroelastomer compositions have low glass transition temperatures. The compositions have sufficient mechanical strength to be used in the preparation of shaped articles. Due to the low glass transition temperatures of the fluoroelastomers shaped articles may be prepared that remain their flexibility at low temperatures. The fluoroelastomers are prepared by curing fluoropolyethers in a radical curing reaction. The fluoropolyethers are functionalized to have functional groups that are reactive in a radical curing reaction to allow cross-linking the fluoropolyethers to provide an elastomeric material. In a radical curing reaction free radicals are generated by a radical generating compound. The free radicals are typically generated under the influence of heat or radiation, such as actinic radiation, or as the result of a redox reaction. The radical generating compound is typically part of a curing system. The curing system may additionally also contain a curing co-agent, which may interact with the curing generating compound and the functional groups of the fluoropolyethers.

The resulting cured product contains fluoropolyether segments that are linked with each other as a result of the radical cross-linking reaction. The resulting cured products are therefore referred to as a fluoropolyether elastomer as they contains, typically as a major component fluoropolyether segments.

Radically cured elastomers differ from elastomers made by different curing system in their chemical composition. Alternative curing systems, for example those involving ammonia may lead to polymers containing triazine groups. Radically cured elastomers can therefore be free of triazines or triazine groups. Triazine groups can be detected, for example, by strong absorption peaks at 1550-1560 cm$^{-1}$ in FT-IR analysis (using 50 μm thin polymer samples). The absence of IR bands at such wave length is an indication of the absence of triazine groups.

The components and methods will now be described in greater detail.

Fluoropolyethers

Suitable fluoropolyethers are compounds containing perfluoroalkylene oxo moieties selected from (—$C_4F_8O$—), (—$C_3F_6O$—), (—$C_2F_4O$—), (—$CF_2O$—) or combinations thereof. Examples include combinations of perfluoroalkylene oxo groups like (—$C_2F_4O$—) and (—$CF_2O$—); (—$C_4F_8O$—), (—$C_2F_4O$—) and (—$CF_2O$—); (—$C_4F_8O$—) and (—$C_2F_4O$—); (—$C_3F_6O$—) and (—$C_2F_4O$—). These units may be present in a random order.

The fluoropolyethers can have a linear backbone or they can be branched (in which case the backbone may comprise side chains). Side chains may be present, for example, if the fluoropolyethers contains branched (—$C_3F_6O$—) or branched (—$C_4F_8O$—) units rather than linear (—$C_3F_6O$—) or (—$C_4F_8O$—) units.

The fluoropolyethers are functionalized which means they contain at least one functional group. The functional groups are reactive to a radical curing system in a radical curing reaction. This means they allow the formation of links between fluoropolyethers in a radical curing reaction, i.e. after activation of the curing agent. Examples of such functional groups include:
(i) halogens selected from iodine, bromine and chlorine with iodine being preferred;
(ii) halogen containing linking groups, i.e. groups linking the halogen(s) with a perfluoroalkylene oxo moiety of the fluoropolyether. Typically, the linking groups contains from 1 to 10 carbon atoms. Examples include alkylhalogens having 1 to 10 carbon atoms. The alkylhalogens may be non-fluorinated or fluorinated or perfluorinated. They may additionally contain or they may not contain oxygen or nitrogen atoms and wherein the halogen. The halogen-containing linking groups may contain one or more than one halogens as defined in (i) above;
(iii) nitrile groups;
(iv) nitrile containing linking groups containing in addition to the nitrile carbon(s) from 1 to 10 carbon atoms. The nitrile containing linking groups may be alkylene nitriles. The alkylene nitriles may be non-fluorinated, fluorinated or perfluorinated. They may also contain oxygen or nitrogen atoms, preferably catenary oxygen or nitrogen atoms, i.e., atoms interrupting the carbon-carbon chain. The linking groups may contain one or more than one nitrile group.
(v) ethylenically unsaturated groups of the general formula —Z—CW=CW$_2$, wherein W represents independently H, Cl, F or CF$_3$ and Z represents a chemical bond or an alkylgroup of 1 to 10 carbon atoms optionally containing fluorine, chlorine, oxygen, nitrogen or sulphur atoms or combinations thereof, such as for example —CH$_2$O—, —CH$_2$OC(O)—, —CH$_2$—O—NHC(O)—, —CH$_2$CH$_2$OC(O)—, perfluoroalkylene (e.g., —CF$_2$—) with the proviso that at least one W, preferably 2 W's represent H.

The fluoropolyether may also contain a combination of different functional groups, for example a combination of functional groups (i) and (ii), or (i) and (iii), (i) and (iv), (i) and (v), (ii) and (iii), (ii) and (iv), (ii) and (v), (iii) and (iv), (iii) and (v) or (iv) and (v). In a preferred embodiment, the functional groups are of the same type, e.g. the functional groups are all halogens or all unsaturated units.

At least one (preferably the majority or all) functional group is positioned at a terminal position of the fluoropolyethers, or at a position adjacent to the terminal position. The term "terminal position" as used herein encompasses the terminal position of the backbone but may also include a terminal position of a side chain in case of non-linear fluoropolyethers.

Preferably, the fluoropolyethers contain two or more than two functional groups, i.e. the fluoropolyethers are preferably bifunctional, trifunctional or polyfunctional.

In a preferred embodiment, the fluoropolyethers are perfluorinated. As used herein above and below the term "perfluorinated" means an organic group or an organic compound wherein all hydrogen atoms have been replaced by fluorine atoms. A perfluorinated group or compound may, however, still contain other atoms than fluorine and carbon atoms, like, for example nitrogen atoms, oxygen atoms, chlorine atoms, bromine atoms and iodine atoms. For example, a F$_3$C— or a F$_3$C—O— would be a perfluorinated methyl or a perfluorinated methoxy groups, respectively. Contrary to perfluorinated groups or compounds, a group or compound where not all hydrogen atoms have been replaced will be referred to herein as a "partially fluorinated" group or compound. For example, a F$_2$HC— or a F$_2$HC—O— group would be a partially fluorinated methyl or methoxy group, respectively. In case of perfluorinated polyethethers, the linking groups, if presented, are also perfluorinated.

Preferably, the fluoropolyethers consist essentially of units selected from (—$CF_2O$—), (—$C_2F_4O$—), (—$C_3F_6O$—) or (—$C_4F_8O$—), or a combination of one or more of (—$CF_2O$—), (—$C_4F_8O$—), (—$C_3F_6O$—) and (—$C_2F_4O$—) units. The term "consisting essentially of" as used herein means the compound contains at least 80 mole %, preferably at least 90 mole %, of the afore-mentioned units.

The remainder of the backbone preferably includes functional groups and residues linking the functional groups with the perfluoroalkylene oxo groups described above.

Typical examples of functionalized fluoropolyethers include those represented by the general formula

X-A-Y wherein X and Y are the same or different functional groups that are reactive to a radical curing system in a radical curing reaction as described above and A denotes a fluoropolyether segment, comprising or consisting of perfluoroalkylene oxo groups selected from (—$C_4F_8O$—), (—$C_3F_6O$—), (—$C_2F_4O$—), (—$CF_2O$—) or combinations thereof.

Particular examples of functionalized fluoropolyethers can be represented by the formula:

$$XCF_2O(CF_2O)_w(C_2F_4O)_x(C_3F_6O)_y(C_4F_8O)_zCF_2Y$$

wherein X and Y independently from each other represent a functional group that is reactive to a radical curing system in a radical curing reaction as described above. w, x, y and z are independent from each other integers from 0 to 30, with the proviso that w+x+y+z is at least 6 and wherein the perfluoroalkylene oxo units may be placed randomly. Preferably, X and Y represent independently a halogen or an alkyl halogen having 1 to 10 carbon atoms. A preferred halogen is iodine.

Preferably, the polyether unit A comprises units selected from (—(CF$_2$)$_4$O—), (—(CF$_2$)$_2$O—), (—CF$_2$O—) or combinations thereof such as combinations of (—(CF$_2$)$_4$O—) and (—(CF$_2$)$_2$O—) units; (—(CF$_2$)$_4$O—), (—(CF$_2$)$_2$O—) and (—CF$_2$O—) units, (—(CF$_2$)$_2$O—) and (—CF$_2$O—) units; (—(CF$_2$)$_4$O—) and (—CF$_2$O—) units.

In one embodiment the fluoropolyether can be represented by the formula:

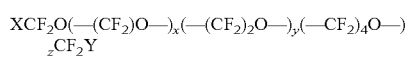

wherein x and y are independent from each other integers from 2 to 12 and wherein z is an integer from 0 to 12 and wherein the (—CF$_2$O—) and (—(CF$_2$)$_2$O—) units and (—(CF$_2$)$_4$O—) units if present may be placed randomly and wherein X and Y are the same or different functional groups as described above. Preferably, X and Y are iodine or unsaturated groups as described above.

The fluoropolyethers are typically liquid (at ambient conditions, i.e. 25° C. and about 1 bar). They are also of low molecular weight. The fluoropolyethers generally have a molecular weight of up to about 25,000 g/mole, or up to about 15,000 g/mole, typically from about 400 g/mole to about 15,000 g/mole, from about 1,200 to about 14,900, preferably from about 450 to about 9,000 g/mole. The fluoropolyethers may be mixtures and the molecular weight referred to above may be the weight average molecular weight of the mixture (as can be determined, for example, by size exclusion chromatography). Also mixtures of fluoropolyethers or perfluoropolyethers may be used. If mixtures are used, it is preferable that the weight percent of di- or multifunctional components is higher than 75%.

Fluoropolyethers as described above and their synthesis are known. For example, perfluoropolyethers having a backbone characterized by blocks of —CF$_2$CF$_2$O— units can be made from tetrafluoroethylene epoxide, as described in U.S. Pat. No. 3,125,599. Others, made by reacting oxygen with tetrafluoroethylene are characterized by a backbone made of repeating —CF$_2$O— units (see for example U.S. Pat. No. 3,392,097). Perfluoropolyethers having a backbone of —C$_3$F$_6$O— units in combination with —CF$_2$O— and —CF(CF$_3$)O— units are described for example in U.S. Pat. No. 3,699,145. Further useful examples of perfluoropolyethers include those having a backbone of repeating —CF$_2$O— and —CF$_2$CF$_2$O— units (as is disclosed in U.S. Pat. No. 3,810,874). Perfluoropolyethers can also be obtained by the polymerization of HFPO using dicarboxylic fluorides as polymerization initiators, as is described for example in U.S. Pat. Nos. 4,647,413 and 3,250,808. Perfluoropolyethers derived from HFPO contain branched perfluoroalkyl groups and at least one of the units (—C$_3$F$_6$O—) is not linear, e.g. the (—C$_3$F$_6$O—) is a —CF$_2$—CF(CF$_3$)—O— unit. HFPO derived perfluoropolyethers are also commercially available, for example, under the trade designation of KRYTOX, available from DuPont de Nemours. Fluoropolyether, in particular of the linear type and including functionalised fluoropolyethers are also commercially available, for example under the trade designation of FOMBLIN, FOMBLIN Z DEAL from Solvay Solexis and DEMNUM from Daikin. The conversion of functionalised fluoropolyethers into fluoropolyethers containing functional groups as listed above, can be carried out by known methods of organic synthesis.

For example fluoropolyethers having nitrile functional groups can be obtained from the corresponding precursor perfluoropolyethers as is described, for example, in U.S. Pat. No. 3,810,874, 4,647,413 or 5,545,693. By their way of synthesis, the precursor perfluoropolyethers typically have acid fluoride end groups. These acid fluoride end groups may be converted to esters via reaction with an appropriate alcohol (such as methanol). The esters may be subsequently converted to amides via reaction with ammonia. The amides may then be dehydrated to nitriles in an appropriate solvent (such as DMF) with pyridine and trifluoroacetic anhydride. Alternatively the amides may be dehydrated with other reagents such as P$_2$O$_5$ or PCl$_3$.

Fluoropolyethers having halogen functional groups can be obtained, for example, from halogen exchange reactions of the fluoropolyether carbonylfluoride with potassium iodide (KI) or lithium iodide (LiI) as described in U.S. Pat. No. 5,288,376 or Journal of Fluorine Chemistry 126, (2005), 45-51.

Fluoropolyethers having ethylenically unsaturated groups, can be obtained, for example, from the reaction of fluoropolyether esters with allylamine, diallylamine, or 2-aminoethylvinylether using methods described in U.S. Pat. No. 3,810,874. Other preparations include dehalogenation of fluoropolyethers such as described in U.S. Pat. No. 5,453,549. Fluoropolyethers having an acrylic functional group can be obtained from the corresponding alcohol, after reaction with acryloylchloride in the presence of a tertiary amine, for example triethylamine.

It is an advantage of the present invention that a liquid composition can be used for making fluoroelastomers as this may allow the use of injection molding processes or reduces the costs for injection molding. The viscosity can be conveniently adapted by adding fillers to create a more paste-like consistency.

The fluoropolyethers are preferably present in an amount of at least 30% by weight based on the weight of the curable composition. Typical amounts include at least 35% or at least 40% by weight, preferably at least 50% or at least 70% by weight based on the weight of the total curable composition. The curable composition may contain, alongside the curing system other ingredients like fillers or other additives.

In a specific embodiment, the curable composition further contains one or more solid fluoropolymers. Typically, the fluoropolymers may be blended with the fluoropolyethers. The addition of the fluoropolymers may increase mechanical properties like tensile strength or hardness of the resulting elastomer composition, while the glass transition temperature of the resulting fluoropolyether segments containing elastomer remains low. Fluoropolymers may be added as fillers. However, in a specific embodiment, the fluoropolymers are reactive to the radical curing system and cross-link with the fluoropolyethers. Suitable reactive fluoropolymers will be described below.

Reactive Fluoropolymers

Suitable fluoropolymers include those comprising repeating units derived from at least one fluorinated olefin, preferably a perfluorinated olefin and further comprising at least one functional group that is reactive to a radical curing system in a radical curing reaction. Useful fluoropolymers typically have a glass transition temperature below 25° C. Preferably, the fluoropolymers are amorphous, i.e. they are non-crystalline. Typically, they do have a melting range spanning at least 5° C. rather than a distinct melting point spanning over up to 3° C. Suitable perfluorinated olefins include those represented by the formula $CF_2=CY-R_f$, wherein Y is F, Cl or $CF_3$ and Rf is fluorine or a C1-C8 fluoroalkyl. Examples of suitable olefins include tetrafluoroethylene (TFE), hexafluoropropylene (HFP), and chlorotrifluoroethylene (CTFE). A particularly suitable olefin includes TFE. Preferably, the fluoropolymer comprises predominantly repeating units derived from TFE or from TFE and HFP. "Predominantly" means that repeating units derived from these monomers are the major component (by weight) of the polymer. The fluoropolymers may further comprise interpolymerized units derived from one or more perfluorinated vinyl or allyl ethers. Suitable perfluorinated ethers include, for example $CF_2=CF(CF_2)_nOCF_3$, $CF_2=CCF(CF_2)_nOCF_2OCF_3$, $CF_2=CF(CF_2)_nOCF_2OCF_2CF_3$, $CF_2=CF(CF_2)_nOCF_2OCF_2CF_2CF_2OCF_3$, $CF_2=CF(CF_2)_n-OCF_2CF_2OCF_3$, $CF_2=CF(CF_2)_n-OCF_2CF_2CF_2OCF_3$, $CF_2=CF(CF_2)_n-OCF_2CF_2CF_3$, $CF_2=CF(CF_2)_n-OCF_2CF(CF_3)OCF_2CF_2CF_3$, and $CF_2=CF(CF_2)_nOCF_2CF(CF_3)OCF_2CF(CF_3)OCF_2CF_2CF_3$, $CF_2=CF(CF_2)_nOCF_2OCF_2OCF_3$ wherein n represents 1 (in case of allyl ethers) or 0 (in case of vinyl ethers).

The ether groups of the incorporated vinyl or allyl ethers are located in the side chains of the fluoropolymer. They are typically not part of the polymer backbone.

The fluoropolymers may optionally comprise repeating units derived from monomers that are non perfluorinated monomers, for example, partially fluorinated olefins or non-fluorinated olefins. Suitable monomers include those of the formula $CY'_2=CY'-R$, wherein each Y' independently represents, H, F or Cl, R is H, F, or a C1-C12, preferably C1-C3 alkyl group with the proviso that at least one Y' is not F.

Suitable examples of partially-fluorinated monomers include vinylidene fluoride (VDF). Suitable examples of non-fluorinated hydrogen-containing monomers include hydrocarbon olefins, such as for example ethene, propene, butene, pentene, hexene, and the like.

Combinations of the above-mentioned optional monomers may also be used.

In a preferred embodiment, the fluoropolymer is perfluorinated, which means it is exclusively derived from perfluorinated monomers.

The fluoropolymers further comprise at least one functional group capable of reacting under radical conditions, i.e. in the presence of free radicals. The functional group is chosen such that it can react with the functional groups of the co-agent and/or with the functional group(s) of the fluoropolyether under radical conditions.

Suitable functional groups include halogen atoms and nitriles. The halogen capable of participating in a radical reaction can be chlorine, bromine or iodine. Preferably the halogen is iodine.

The functional groups capable of participating in the radical reaction may be located at a terminal position of the backbone chain, but can also be distributed along the polymer chain.

Halogens, which are capable of participation in the radical reaction, can be introduced at a terminal position of the polymer chain, by using a chain transfer agent that contains at least I or Br atoms during the polymerisation. Chain transfer agents are compounds capable of reacting with the propagating polymer chain and terminating the chain propagation. Examples of suitable chain transfer agents include those having the formula $R_fX_p$, wherein X is Cl, Br or I, preferably I, Rf is an p-valent fluoroalkyl radical or perfluoroalkyl radical having from 1 to 12 carbon atoms, which, optionally may also contain chlorine atoms. Typically, p is 1 or 2. Specific examples include $CF_2Br_2$, $Br(CF_2)_2Br$, $Br(CF_2)_4Br$, $CF_2ClBr$, $CF_3CFBrCF_2Br$, $I(CF_2)_2I$, $I(CF_2)_4I$. Still further examples of chain transfer agents include non fluorinated chain transfer agents such as di-iodoalkanes, in particular α,ω-diiodoalkanes, iodo-bromo alkanes, dibromoalkanes etc. Specific examples include iodomethane, di-iodomethane, di-bromomethane and α,ω-iodo perfluoroalkanes.

In addition to the suitably functionalized chain transfer agents, halogen atoms can be introduced at the terminal position by using a suitable redox initiator system. Examples of useful initiator system includes a radical initiator and halogenated salts like, but not limited to, $X(CF_2)_nSO_2M$ with n=1 to 10 (where X is Cl, Br or I) and wherein M represents a monovalent metal, such as, e.g., Na. Still further, the initiation and/or polymerization may be conducted in the presence of a halide salt such as a metal or ammonium halide including for example potassium bromide, ammonium bromide and potassium or sodium iodide to introduce a halide at a terminal carbon atom of the fluorinated polymer.

In addition to the functional groups at the terminal position, functional groups can also be distributed along the polymer chain, e.g., by incorporating a suitable monomer, also known as cure site monomer. Cure site monomers are monomers containing one or more functional groups that react under radical conditions, i.e. in the presence of a radical generating compound.

Useful cure-site monomers include for instance:

(a) bromo- or iodo- or chloro-(per)fluoroalkyl-(per)fluorovinylethers having the formula:

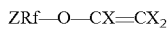

$ZRf-O-CX=CX_2$ wherein each X may be the same or different and represents H or F, Z is Cl, Br or I, Rf is a (per)fluoroalkylene C1-C12, optionally containing chlorine and/or ether oxygen atoms. Suitable examples include $ZCF_2-O-CF=CF_2$, $ZCF_2CF_2-O-CF=CF_2$, $ZCF_2CF_2CF_2-O-CF=CF_2$, $CF_2CFZCF_2-O-CF=CF_2$, wherein Z represents Br, I or Cl; and (b) bromo- or iodo- or chloro-perfluoroolefins such as those having the formula:

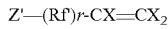

$Z'-(Rf)r-CX=CX_2$ wherein each X independently represents H or F, Z' is Br, I or Cl, Rf is a perfluoroalkylene $C_1-C_{12}$, optionally containing chlorine atoms and r is 0 or 1.

Examples include: bromo- or iodo-trifluoroethene, 4-bromo-perfluorobutene-1,4-iodoperfluorobutene-1, or bromo- or iodo-fluoroolefins such as 1-iodo, 2,2-difluoroethene, 1-bromo-2,2-difluoroethene, 4-iodo-3,3,4,4-tetrafluorobutene-1 and 4-bromo-3,3,4,4-tetrafluorobutene-1;

(c) non-fluorinated bromo and iodo-olefins such as vinyl bromide, vinyl iodide, 4-bromo-1-butene and 4-iodo-1-butene.

Further suitable functional groups include nitriles. Nitriles can be introduced in the polymer chain by using nitrile containing monomers. Examples of nitrile containing monomers that may be used include: $CF_2=CF-CF_2-O-Rf-CN$; $CF_2=CFO(CF_2)_rCN$; $CF_2=CFO[CF_2CF(CF_3)O]_p(CF_2)_vOCF(CF_3)CN$ and $CF_2=CF[OCF_2CF(CF_3)]_kO(CF_2)_uCN$ wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group.

Specific examples of nitrile containing fluorinated monomers include perfluoro (8-cyano-5-methyl-3,6-dioxa-1-octene) and $CF_2\!=\!CFO(CF_2)_5CN$, and $CF_2\!=\!CFO(CF_2)_3OCF(CF_3)CN$.

Useful fluoropolymers typically have Mooney viscosities (ML1+10 at 121° C.) of 1 to 150 units, suitably 1 to 100 units. The Mooney viscosity can be determined, for example, according to ASTM D-1646. The fluoropolymers may have a monomodal or bimodal or multi-modal weight distribution.

The amount of functional group containing monomers in the fluoropolymer preferably ranges from at least about 0.001 mole %, more preferably at least about 0.01 mole %. The amount of functional group containing monomers in the fluoropolymer preferably ranges from greater than 0 to below about 5 mole %, more preferably below about 3 mole %.

A particularly suitable fluoropolymer is a TFE-based fluoroelastomer. In particular, it may comprise of at least 20%, preferably at least 30% by mole of repeating units derived from tetrafluoroethylene. In addition, it may comprise at least one perfluorinated vinyl ether and a halogen containing monomer, preferably a perfluorinated iodine containing monomer.

In such copolymers, the copolymerized perfluorinated vinyl ether units constitute from about 1 to about 50 mole % (more preferably 10 to 40 mole %) of total monomer units present in the polymer.

The fluoropolymers can be prepared by free-radical polymerization of the monomers alone or as solutions, emulsions, or dispersions in an organic solvent or water.

Polymerization in an aqueous emulsion or suspension often is preferred because of the rapid and nearly complete conversion of monomers, easy removal of the heat of polymerization, and ready isolation of the polymer. Emulsion or suspension polymerization typically involves polymerizing monomers in an aqueous medium in the presence of an inorganic free-radical initiator system, such as ammonium persulfate (APS) or potassium permanganate, and a surfactant or suspending agent.

Aqueous emulsion polymerization can be carried out continuously under steady-state conditions in which, for example, monomers, water, surfactants, buffers, and catalysts are fed continuously to a stirred reactor under optimum pressure and temperature conditions while the resulting emulsion or suspension is removed continuously (as is described, for example, in U.S. Pat. No. 5,789,489).

An alternative technique includes batch or semi-batch polymerization. This type of polymerization involves feeding the ingredients into a stirred reactor and allowing them to react at a set temperature for a specified length of time or by charging ingredients into the reactor and feeding the monomer into the reactor to maintain a constant pressure until a desired amount of polymer is formed.

The fluoropolymers typically have a higher molecular weight than the fluoropolyether. Typically the fluoropolymers have a weight average molecular weight of at least 25,000 g/mole or at least 50,000 g/mole. The molecular weight may be determined by standard methods such a size exclusion chromatography.

The weight ratio of fluoropolyether to fluoropolymer may vary between 2:3 up to 1:0. The minimum amount of fluoropolyether typically is at least 30% by weight based on the total weight of the curable composition. The presence of reactive fluoropolymers is not required, there their amount can be 0.

Typically, the fluoropolymer is solid at room temperature, which means it is not pourable. "Pourable" as used herein means at least 1 g of a 10 g sample can be poured at ambient conditions (1 bar, 25° C.) from one container into another over a period of 10 minutes. Not pourable accordingly means that no or less than 1 g of a 10 g sample can be poured into the other container within the specified period.

Curing System

The curing system for a radical curing reaction comprises at least one radical generating compound. Useful radical generating compounds contain or generate peroxides, which in turn are believed to generate free radicals upon activation. Activation is preferably achieved by application of heat. Organic peroxides, like dialkyl peroxides or bis(dialkyl) peroxides are preferred. Compounds decomposing to produce free radicals at a temperature above 50° C. are especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dichlorobenzoyl peroxide, tertiarybutyl perbenzoate, alpha, alpha'-bis(t-butylperoxy-diisopropylbenzene), and di[1,3-dimethyl-3-(t-butylperoxy)-butyl]carbonate.

Generally, about 2 to 10 parts of peroxide per 100 parts of fluoropolyether may be used.

Where desirable, the crosslink density of cured fluoropolyethers having nitrile functional groups can be increased by adding an additional crosslinker that will cause crosslinking through the formation of triazine groups in addition to radical crosslinking. Useful examples of such additional crosslinking agents include tetraphenyltin $Sn(Ph)_4$ and perfluorosebacamidine.

A combination of different radical generating compounds may also be used. The curing system may in addition also include at least one coagent.

The co-agent comprises at least two functional groups capable of reacting with the functional groups of the fluoropolyether and the functional groups of the optional fluoropolymer under radical conditions to provide cross-linking. Suitable functional groups include halogens and ethylenically unsaturated groups. In a preferred embodiment, the co-agent includes a polyunsaturated compound which is capable of reacting with the functional groups of the fluoropolyether and optional fluoropolymer in the presence of a radical generating compound under the formation of cross-links.

Further useful co-agents include, for example, fluorinated olefins such as divinylperfluorohexane, or multihalogenated organic compounds, such as for example tri- or tetrahalogenated compounds, like $CBr_4$ or pentaerythritol tetrabromide.

Examples of useful co-agents include but are not limited to triallyl cyanurate; triallyl isocyanurate (TAIC); triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl inalonamide; trivinyl isocyanurate; 2,4,6-trivinyl methyltrisiloxane; N,N'-m-phenylenebismaleimide; diallyl-phthalate and tri(5-norbornene-2-methylene)cyanurate. A preferred co-agent is triallyl isocyanurate.

The co-agent may typically be present in amounts between 1 and 20 parts per hundred parts of fluoropolyether, preferably between 4 and 16 parts per hundred parts fluoropolyether.

The co-agent may be added as such or it may be present on a carrier. A typical example for a carrier is silica.

It is preferred that the functional groups of the co-agent are not the same as the functional groups of the fluoropolyether i.e. it is preferred to use a co-agent having polyunsaturated groups in combination with a halogen or nitrile containing fluoropolyether or vice versa. In another embodiment, when a fluoropolyether is used having at least one ethylenically unsaturated group, it is preferred to use a co-agent having at least two functional groups comprising a halogen. It is believed that such combinations provide a more effective or better cross-linking.

Fillers

Preferably, the curable fluoropolyether compositions further comprise at least one filler. Preferably the fillers are added before curing the composition. The curable fluoropolyether compositions are typically liquids or pastes. In one aspect, fillers may be added to increase the viscosity to obtain a paste-like consistency. A paste-like consistency typically has a Brookfield viscosity between 2,000 and 50,000 centipoises at 25° C.

In another aspect, where a blend of a liquid fluoropolyether with a solid fluoropolymer is used, fillers may be used to facilitate mixing of the fluoropolyether with the fluoropolymer. The fluoropolyether may be pre-dispersed onto the filler. The pre-dispersed fluoropolyether can then more easily be dispersed into and blended with the fluoropolymer.

Fillers can also be used to modify or adapt the rheological properties of the cured fluoroelastomer compositions.

Fillers are typically particles. The particles may be spherical or non-spherical. They may be rods or fibers. Typically the fillers are microsized materials. Typically they have a least one dimension being a length or a diameter of from about 500 nm or 0.05 µm up to about 5,000 µm, up to about 1,000 µm, or up to about 500 µm. Fillers, in particular carbon or silica-containing materials are available in particles sizes (number average) as small as between 500 nm and 30 µm.

Fillers include inorganic or organic materials. Useful examples include bariumsulfate, carbonates, like calcium carbonate and silicone oxide containing materials. Examples of silicone oxide containing fillers include silicas (also referred to as silicon dioxides). Specific examples of silicas include hydrophilic and hydrophobic silica, fumed silica (which are, for example, commercially available under the trade designation AEROSIL from Evonik GmbH, Frankfurt, Germany, such as, for example, AEROSIL 200, AEROSIL R972 or AEROSIL R974; or commercially available under the trade designation NANOGEL from Cabot Corporation), silane-treated fumed silicas (commercially available, for example, under the trade designation CABOSIL from Cabot Corporation) and combinations thereof. Further examples include silicates such as, for example, calcium silicates, aluminium silicates, magnesium silicates and mixtures thereof, such as for example mica, clays and glasses, such as for example glass spheres (commercially available under the trade designation GLASSBUBBLES from 3M Company). Further suitable fillers include halogen-modified silicas, such as 3-halogen propyl triethoxysilane or nitrile-modified silicas. Nitrile-modified silicas can for example be prepared by reacting a commercially available hydroxyl containing silica, such as, for example, AEROSIL 200V (available from Evonik), with a cyano-silane, such as, for example, 3-cyanopropyltriethoxysilane (available from Aldrich), in the presence of ethanol containing hydrochloric acid. The amount of reactants is chosen so as to obtain between 10 and 30% (by weight) of nitrile-modified silica. Further suitable silica-containing fillers include fluorine-modified silicas. Fluorine-modified silicas can be prepared, for example, by reacting a commercially available hydroxyl containing silica, (for examples AEROSIL 200V) with a fluorosilane. A suitable fluorosilane includes HFPO-silanes, which may be prepared from oligomeric HFPO-esters and a silane, such as for example aminoalkyltrialkoxy silane, as is described in U.S. Pat. No. 3,646,085. Further suitable fluorosilanes can be derived from commercially available perfluoropolyethers, such as, for example, FOMBLIN Z Deal (Solvay Solexis) that have been reacted with aminoalkyltrialkoxy silanes, such as 3-aminopropyltrimethoxysilane, as is described in U.S. Pat. No. 6,716,534. The amount of reactants is typically chosen so as to obtain between 1 and 5% (by weight) of fluorine modified silica.

Other examples of suitable fillers include carbon materials. Carbon materials include, for example, nanosized carbon particles like mesoporous carbon nanopowder, available from Sigma Aldrich and carbon nanotubes available from Archema; carbon black or subtypes thereof like, for example, acetylene black; modified carbons, such as, for example graphite fluoride (available, for example, from Central Glass) or Carbofluor (available from Advanced Research Co). Carbon black is commercially available, for example, from Cabot Corporation.

The fillers may be added in an amount between 1 and 50 parts, or between 4 and 30 parts, by weight per hundred parts by weight of fluoropolyethers (phr).

The curable fluoropolyether compositions (and also the cured fluoropolyether compositions) may include further additives, such as for example acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, strontium hydroxide, hydrotalcite, zeolites like Zeoflair available from Zeochem AG etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used. Typically, the amount of acid acceptor used is between 0 and 5 parts per 100 parts of fluoropolyether.

Further useful additives include stabilizers, plasticizers, pigments, antioxidants, processing aids, rheology modifiers, lubricants, flame retardants, flame retardant synergists, antimicrobials, and further additives known in the art of fluoropolymer compounding and rubber processing.

Curable Fluoropolyether Compositions

The curable compositions comprise the fluoropolyethers and the curing system described above.

Typical embodiments of a curable composition include the following:

In one embodiment, the curable composition comprises a liquid fluoropolyether, a co-agent, a radical generating compound and optional fillers and additives.

Suitable examples of curable compositions according to this embodiment include a composition comprising a fluoropolyether having at least one halogen or nitrile functional group and a polyunsaturated co-agent, a peroxide and optional fillers and additives. Of these, a composition wherein the fluoropolyether has at least two iodine functional groups and the co-agent is a polyunsaturated compound are preferred.

Further suitable examples of curable compositions according to this embodiment include: a composition comprising a fluoropolyether having at least one ethylenically unsaturated group in combination with a co-agent having at least two halogens, a peroxide and optional fillers and additives.

In a further embodiment, the curable composition comprises a fluoropolyether, a fluoropolymer as defined above, a co-agent, a peroxide and optional fillers and additives.

Suitable examples according to this embodiment include a composition comprising a fluoropolyether comprising at least one halogen or nitrile functional group, in combination with a fluoropolymer comprising at least one halogen of nitrile functional group, a co-agent comprising at least two ethylenically unsaturated groups, a peroxide and optional fillers and additives.

Further suitable examples of curable compositions according to this embodiment include a composition comprising a fluoropolyether comprising at least one ethylenically unsaturated group in combination with a fluoropolymer comprising at least one halogen or nitrile functional group, a co-agent comprising at least two halogen functional groups, a peroxide and optional fillers and additives.

The curable fluoropolyether compositions may be prepared by mixing the ingredients using known mixing devices such as, for example, rotary mixers, planetary roll mixers, acoustic mixers, a high speed dispenser or a Hauschild™ Speedmixer may be used. The temperature of the mixture during mixing typically should not rise above about 120° C. The mixture can be applied as a coating or transferred to a mold and cured. Curing may be carried out in open air, for example pressure-less in open molds or hot air tunnels, but is preferably carried out in closed molds. Curing in closed molds offers the advantage of not exposing the operators to fumes generated during the curing reaction. In an alternative embodiment curing can be done in an autoclave.

In case fluoropolyether are used with reactive fluoropolymers it is recommended to first mix the fluoropolyether with a filler to pre-disperse the fluoropolyether. Known mixing devices such as, for example, rotary mixers, planetary roll mixers, acoustic mixers, a high speed dispenser or a Hauschild™ Speedmixer may be used. For good mixing with the fluoropolymer, it is preferred that the mixture of the fluoropolyether and the filler is in the form of a powder. To this mixture further fillers and additives may be added. This mixture may then be compounded homogeneously with the co-agent and the fluoropolymer using conventional rubber mixing devices, such as Banbury mixers or roll mills. The temperature of the mixture during mixing typically may not rise above about 120° C. During mixing the components and additives are distributed uniformly.

Fluoropolyether Elastomers

Compositions comprising fluoropolyether elastomers are obtainable by subjecting the curable compositions described above to a radical curing reaction.

Such fluoropolyether elastomer compositions have a glass transition temperature of less than about −40° C., less than about −50° C., less than −60° C., less than −80° C. or even less than −100° C. Glass transition temperatures as low as −117° C. have been recorded.

Curing is typically achieved by heat-treating the curable fluoropolyether composition. The heat-treatment is carried out at an effective temperature and effective time to create a cured polymer. The heat-treatment activates the radical generating compound to produce radicals. Optimum conditions can be tested by examining the resulting fluoroelastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 0.5 to 30 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours.

The reaction product of the curing reaction of the curable compositions is a composition comprising cross-linked fluoropolyethers. The cross-linked (cured) fluoropolyethers are elastomers (also referred to herein as fluoropolyether elastomers).

The fluoropolyether elastomers (cured fluoropolyethers) provided herein and the compositions containing them have a glass transition temperature of less than about −40° C., less than about −50° C., less than −60° C., less than −80° C. or even less than −100° C., for example up to −117° C. or less.

The fluoropolyether elastomer compositions comprise a cured fluoropolyether-based polymer containing fluoropolyether segments having a weight average molecular weight of from 400 g/mole up to 25,000 g/mole, preferably up to 15,000 g/mole and containing or consisting of a plurality of moieties selected from (—$C_4F_8O$—), (—$C_3F_6O$—), (—$C_2F_4O$—), (—$CF_2O$—) or combinations thereof.

The fluoropolyether elastomer compositions may further contain segments of a fluoropolymer having a molecular weight higher than the molecular weight of the fluoropolyether segments in case reactive fluoropolymers have been used.

The fluoropolyether elastomer compositions typically have an elongation at break of at least 10%. The cured fluoropolyether compositions typically reach a maximum torque (MH) (measured according to ASTM D 5289-93a) greater than 2.

In order to have high chemical resistance, the fluorine content of the fluoropolyether elastomers provided herein is desirably high, like for example greater than 41%, greater than 52% by weight or even greater than 56% by weight. Materials with high fluorine content can be prepared by choosing, for example, to use perfluoropolyethers, optionally in combination with a reactive fluoropolymer.

The cured fluoropolyethers or compositions containing them have an elongation at break of at least 10%. They are of a rubber-like consistency and have elastomeric properties. This means they can be stretched to at least 10% of their initial length by applying a suitable force (as described in the method section with respect to elongation at break) and that retain their original length after that force is no longer applied.

Preferably, the fluoropolyether elastomers or compositions containing them have an elongation at break of at least 50%. Typically they, may have an elongation of break from about 50% up to about 100% or up to about 120% or even beyond 120%. Preferably, they have in addition also a shore A hardness of at least 15. Typically, the have a shore A hardness from 15 up to about 90 or up to about 100. More preferably, they have in addition also a tensile strength of at least 1 MPa. Typically, they may have tensile strength of up to 25 or up to 15 or up to 10 MPa.

The cured fluoropolyether elastomers obtainable by the methods described herein may have one or more or all of the following properties:
(i) a glass transition temperature (Tg) of less than −50° C., preferably less than −60° C., more preferably less than −80° C. or less than −100° C.;
(ii) an elongation at break of at least 50%;
(iii) a tensile strength of at least 1 MPa, preferably at least 1.3 MPa;
(iv) a shore A hardness of at least 15, preferably at least 25 and more preferably at least 40;

Typical embodiments of cured fluoropolyether elastomers or compositions containing them have a glass transition temperature of less than −50° C., a tensile strength of at least 1 MPa, a shore A hardness of at least 25, an elongation at break of at least 50% and a fluorine content of at least 40% by weight.

Articles and Methods of Making Articles

The curable compositions provided herein may be used to make shaped articles, for example, by molding. Conventional processing techniques used in fluoropolymer compounding or processing may be used, such as injection molding, in particular liquid injection molding, compression molding, extrusion or calandering. Alternatively, articles in the form of a sheet can be made by curing a layer of the fluoropolyether compositions pressure-less in an open air oven or hot air tunnel. Such sheets can be further shaped by cutting or stamping methods.

Compression molding typically comprises placing an uncured fluoroelastomer composition into a heated mold cavity and subsequently closing the mold using adequate pressure to shape the article. After retaining the rubber-like material at sufficient temperature for sufficient time to allow crosslinking (curing) to proceed, it is typically de-molded.

Liquid injection molding is a shaping technique whereby the curable composition is pumped into a heated chamber from which it is then injected into a hollow mold cavity by hydraulic means (e.g. a piston). After crosslinking (curing) the shaped article is de-molded.

The curable compositions provided herein may be used to make articles for use in the aircraft, aerospace, chemical processing industry. Particularly, they may be used to make shaped articles for example by molding. Curing is typically achieved during molding. Alternatively, the composition may be cured and then shaped into an article for example by cutting, like die cutting. The curable compositions may be used to make a shaped article for use in cryogenic applications, including gas compression and expansion, handling, loading, storing, transportation of liquefied gasses (like $CO_2$, Ar, $H_2$, CO, $N_2$, $H_2S$, $Cl_2$, $NH_3$, liquefied hydrocarbon gases and in particular natural gas and its substitutes like LNG, SNG, LPG, CtL, CNG. Typical examples of suitable shaped articles include seals, like O-rings. Typical seals also include those having at least one surface facing or to be applied to face a liquid or gaseous hydrocarbon, like but not limited to natural gas of a fuel for a combustion engine. Typically, the shaped articles are components of a fuel management system comprising at least one fuel pump and/or at least one fuel injector, wherein the fuel preferably is a hydrocarbon, a hydrocarbon ester or a hydrocarbon alcohol, like but not limited to ethanol or methanol. Examples of such components or suitable articles in general include O-rings, shaft seals, gaskets, tubes, linings, sheets, containers, lids, hoses or components thereof, membranes and bonded seals. Specific examples of articles include components of a fuel system as described above wherein the fuel system is the fuel system of a motor vehicle, an airplane, a helicopter, an aerospace vehicle or a water craft.

In the following list specific embodiments will be described to further illustrate the invention. This list is provided for illustrative purposes only and is not meant to limit the invention thereto.

Embodiment 1

A curable composition comprising
a) at least one functionalized fluoropolyether having a molecular weight from about 400 g/mole and up to about 25,000 g/mole and containing moieties selected from (—$C_4F_8O$—), (—$C_3F_6O$—), (—$C_2F_4O$—), (—$CF_2O$—) or combinations thereof and wherein the fluoropolyether is functionalised to containing at a terminal position or at a position that is adjacent to the terminal position at least one functional group that is reactive to a radical curing system in a radical curing reaction, and
b) at least one radical curing system comprising at least one radical generating compound.

Embodiment 2

The curable composition of embodiment 1 wherein the radical curing system further comprises at least one coagent.

Embodiment 3

The curable composition of any one of embodiments 1 or 2 which cures in a radical curing reaction to produce a composition comprising a fluorinated elastomer having a glass transition temperature of less than −40° C.

Embodiment 4

The curable composition of any one of embodiments 1 or 3 which cures in a radical curing reaction to produce a composition comprising a fluorinated elastomer having a glass transition temperature of less than −50° C. or from −60° C. to −120° C.

Embodiment 5

The curable composition of any one of the preceding embodiments which cures in a radical curing reaction to produce a composition comprising a fluorinated elastomer having a glass transition temperature of from −60° C. to −120° C., an elongation at break of at least 50%, a shore A hardness of at least 15 and a tensile strength of at least 1 MPa Embodiment 6

The curable composition according to any one of the preceding embodiments wherein the functionalized fluoropolyether has a molecular weight of from about 1,200 up to about 14,900 g/mole.

Embodiment 7

The curable composition according to any one of the preceding embodiments wherein the functionalized fluoropolyether is present in an amount of at least 30% by weight.

Embodiment 8

The curable composition according to any one of the preceding embodiments wherein the functionalized fluoropolyether is represented by the formula

X-A-Y wherein X and Y are the same or different residues comprising the functional groups that are reactive to a radical curing system in a radical curing reaction and A denotes a polyoxyperfluoroalkylene moiety of units selected from (—$C_4F_8O$—), (—$C_3F_6O$—), (—$C_2F_4O$—), (—$CF_2O$—) or combinations thereof.

Embodiment 9

The curable composition according to anyone of the preceding embodiments wherein the functionalized fluoropolyether is represented by the formula:

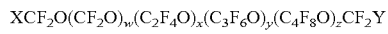

wherein X and Y independently from each other represent a residue containing at least one functional group that is reactive to a radical curing system in a radical curing reaction and are selected from
(i) halogens and alkylhalogens wherein the alkylgroup of the alkylhalogens has 1 to 10 carbon atoms and may be non-fluorinated, fluorinated or perfluorinated and optionally contains oxygen or nitrogen atoms and wherein the halogens are selected from iodine, bromine and chlorine;
(ii) a nitrile group or an alkylene nitrile group wherein the alkylene group of the alkylene nitrile group has 1 to 10 carbon atoms and may be non-fluorinated, fluorinated, or perfluorinated and optionally contains oxygen or nitrogen atoms;
(iii) an ethylenically unsaturated group —Z—CW=$CW_2$, wherein W independently represents H, Cl, F or $CF_3$ and Z represents a chemical bond, an alkylgroup of 1 to 10 carbon atoms optionally containing fluorine, chlorine, oxygen, nitrogen or sulphur atoms or combinations thereof, with the proviso that at least one residue W is H.

Embodiment 10

The curable composition according to anyone of the preceding embodiments wherein the curing system contains a co-agent selected from polyvinyl or polyallyl compounds.

Embodiment 11

The curable composition according to anyone of the preceding embodiments wherein the radical generating compound is a peroxide.

Embodiment 12

The curable composition according to anyone of the preceding embodiments comprising at least one filler selected from silica containing material, carbon-containing material or a combination thereof.

Embodiment 13

The curable composition according to anyone of the preceding embodiments comprising at least 40% by weight based on the total amount of the composition of the fluoropolyether.

Embodiment 14

The curable composition according to anyone of the preceding embodiments comprising at least 40% by weight based on the total amount of the composition of functionalized fluoropolyether and at least one fluoropolymer having a glass transition temperature of less than 25° C. and that is curable in a radical curing reaction and has a molecular weight that is greater than that of the fluoropolyether.

Embodiment 15

A composition comprising a cured fluoroelastomer obtainable by curing the curable composition according to any one of the preceding embodiments.

Embodiment 16

The composition of embodiment 15 wherein the composition has a glass transition temperature of less than −50° C., a tensile strength of at least 1 MPa, a shore A hardness of at least 25, an elongation at break of at least 50%.

Embodiment 17

A composition comprising a cured fluoroelastomer having a glass transition temperature of less than −50° C., a tensile strength of at least 1 MPa, a shore A hardness of at least 25, an elongation at break of at least 50% and that contains a plurality of cross-linked fluoropolyether segments of moieties selected from (—$C_4F_8O$—), (—$C_3F_6O$—), (—$C_2F_4O$—), (—$CF_2O$—) or combinations thereof and having a molecular weight of 400 g/mole and up to about 25,000 g/mole, wherein the composition is free of triazine groups.

Embodiment 18

The composition of any one of embodiments 15 to 17 comprising a plurality of units having a general formula $CF_2O(CF_2O)_w(C_2F_4O)_x(C_3F_6O)_y(C_4F_8O)_zCF_2$ wherein w, x, y and z are independent from each other integers from 0 to 30, with the proviso that w+x+y+z is at least 6.

Embodiment 19

The composition according to any one of embodiments 15 to 18 comprising a plurality of units having a general formula

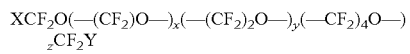

wherein x and y are independent from each other integers from 2 to 12 and wherein z is an integer from 0 to 12 and wherein the (—$CF_2O$—) and (—$(CF_2)_2O$—) units and (—$(CF_2)_4O$—) units if present may be placed randomly.

Embodiment 20

A method of making a composition comprising a fluoroelastomer having a glass transition temperature of less than −40° C., said method comprising providing a curable composition according to any one of embodiments 1 to 14 and subjecting the curable composition to a radical curing reaction.

Embodiment 21

A shaped article obtained by injection or compression molding the curable composition according to any one of embodiments 1 to 14.

The following examples are provided to further illustrate the compositions and methods provided herein. These following examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent.

Examples
Test Methods
Hardness:

Hardness Shore A (2") was measured on samples that were post cured for 20 hours at 250° C., according to ASTM D-2240.

Glass Transition Temperature (Tg):

Tg was measured by modulated temperature DSC using a TA Instruments Q200 modulated DSC, available from TA Instruments. Conditions of measurement: −150° C. to 50° C. @ 2 or 3° C./min, modulation amplitude of +−1° C./min during 60 sec.

Tensile Strength at Break, Elongation at Break and Stress at 100% Elongation:

These properties were determined using an Instron™ mechanical tester with a 1 kN load cell in accordance with ASTM D412 (DIE D). All tests were run at a constant cross head displacement rate of 500 mm/min. Each test was run three times. The values reported are averages of the three tests.

Stress at 100% Elongation, Elongation at Break, and Tensile Strength at Break were reported in units of Mega Pascals (MPa), %, and MPa respectively. Elastomeric properties can be determined as done for measuring the elongation at break. The sample is stretched to 10% of its original length. Then the stretching is stopped and the sample is allowed to regain its original shape. The sample is elastomeric if it regains its original length within 15 minutes.

Curing Properties:

Vulcanisation properties were measured using an Alpha Technologies Moving Die Rheometer (at 177° C. in accordance with ASTM D 5289-93a, reporting minimum torque (ML), maximum torque (MH) and delta torque (which is the difference between MH and ML). Torque values are reported in·lbs. Also reported are tg δ @ML and tg δ @MH. Further reported are parameters indicating the curing speed such as Ts2 (the time required to increase the torque by two units over the ML); T50 (the time to increase torque above ML by 50% of delta torque), and T90 (the time to increase torque above ML by 90% of delta torque), all of which were reported in minutes.

Sample Preparation
Materials Used:
Functionalised fluoropolyethers (PFE):
PFE-1: I—CF$_2$O(CF$_2$O)$_{9-11}$(CF$_2$CF$_2$O)$_{9-11}$—CF$_2$—I
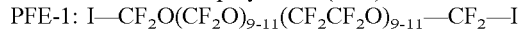

A 1000 ml 3-neck round bottom flask was charged with 500 g (0.25 mol) Fomblin® Z-Deal and 100 g FC77 and stirred. A solution of 32 g (0.56 mol) KOH in 100 g water was added through an additional funnel over 15 minutes and the mixture was heated to 100° C. with a slight reflux for 30 minutes. After the reaction has been completed respiratory vacuum was applied to remove the most solvent and water, the white paste was decanted in a glass tray and dried in a vacuum oven to give a quantitative yield of dipotassium acid salt.

In a next step 204.8 g dipotassium salt (0.1 mole) was added in a 1000 ml flask. A mixture of 26 g concentrated H$_2$SO$_4$ in 240 g water was added and stirred at 90° C. during 1 h. The reaction mixture was transferred to a separation funnel and the organic phase was separated and extracted with FC77, filtered and solvent stripped to isolate 194 g PFPE diacid. A 1000 ml 3-neck round bottom flask was charged with 155 g PFPE diacid (0.078 mole), 10 drops of DMF and 32.5 g thionyl chloride (0.27 mole) were slowly added at 70° C. The acidic gas stream was dedicated over a NaOH water phase. The reaction mixture was kept at 80° C. for 20 hours to give 157 g PFPE diacid chloride. $^{19}$F-NMR revealed a purity of 98 mol %.

112.09 g PFPE diacid chloride (0.056 mole) was stirred with 13 g anhydrous potassium fluoride (0.223 mol) and heated for 20 hours at 65° C. After the reaction has completed a small amount of FC77 was added and all the salts were removed by filtration. Then the solvent was stripped off and the PFPE diacid fluoride was directly transferred to a 1000 ml 3-neck round bottom flask and 19.67 g anhydrous lithium iodide (0.147 mole) was added. The mixture was slowly heated to 190° C. for 1.5 hours and 30 min at 210° C. with off gassing. The mixture was cooled to room temperature, some FC 77 was added and the mixture was filtered over a Celite® column to remove the LiF salt formed. The filtrate was washed with a light alkaline water solution to remove the iodine that was formed as side product. $^{19}$F-NMR revealed a purity of fluoropolyether diiodide of >75 mole %.

PFE-2: I—CH$_2$—CF$_2$O(CF$_2$O)$_{9-11}$(CF$_2$CF$_2$O)$_{9-11}$—CF$_2$CH$_2$—I
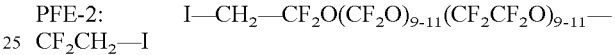

A 2000 ml flask was charged with 800 g dry THF and a mechanical stirrer and reflux condenser were assembled. The reaction mixture was placed under nitrogen. 18.06 g ZnCl$_2$, and 5 g N,N-dimethylcyclohexylamine (0.04 mole) were subsequently added. 10.0265 g NaBH$_4$ was slowly added to the stirred reaction mixture. In a beaker 250 g Fomblin® Z-DEAL and 600 g FC-77 were mixed. The reaction mixture was heated to 45° C. The fluorochemical mixture is slowly added through an addition funnel during 1 h. The mixture was stirred at 60° C. during 12 h. In a next step the reaction mixture was cooled in an ice bath to 10° C. A mixture of 500 ml water and 350 ml HCl solution (25 wt %) were mixed and drop wise added to the reaction mixture. A strong exotherm and gas formation were observed. After 1 h stirring the mixture was transferred to a separation funnel. The organic phase was separated from the water phase and two times washed with water. 240 g fluoropolyether-diol was collected as a transparent liquid. Infrared analysis showed a complete depletion of the carbonyl vibration at 1798 cm$^{-1}$ and a broad OH band around 3400 cm$^{-1}$ appeared. NMR analysis revealed that the reaction was fully completed. In a next step 150 g fluoropolyether diol (0.073 mole) was charged in a glass flask. Furthermore 300 g HFE 7200 and 14.15 g triethylamine (0.14 mole) were added. The reaction mixture was cooled over an ice bath. At 5° C. 17.8 g mesyl chloride (0.155 mole) was slowly added. The mixture was stirred during 24 h at room temperature. Finally the white HCl salt was filtered off and the organic phase was concentrated.

In a last step 135.36 g fluoropolyether-diMes (0.064 mol) was charged in a 500 ml flask. 200 g of dry dimethylformamide was added. Furthermore some HFE 7200 was added until a homogeneous mixture was obtained. 29.75 g anhydrous KI was added. The reaction mixture was stirred at 75° C. during 24 h. After the mixture has been cooled to room temperature two phases appeared. The reaction mixture was transferred to a separation funnel and a small amount of HFE 7200 was added followed by 300 ml water. The organic phase was separated and all volatiles were removed. If at the end a second DMF phase is observed the reaction is further washed with water. $^{19}$F-NMR analysis revealed a conversion of >95 mole %.

PFE-3: $NCCF_2O(CF_2O)_{9-11}(CF_2CF_2O)_{9-11}CF_2CN$

The fluorinated polyether was made starting from perfluoropolyether diester $CH3OC(O)CF_2O(CF_2O)_{9-11}(CF_2CF_2O)_{9-11}CF_2C(O)OCH3$ (average molecular weight of about 2,000 g/mole, obtained under the trade designation Fomblin™ Z-DEAL from Solvay Solexis) according to the process described in U.S. Pat. No. 5,545,693, example 3. In a first step, the perfluoropolyether diester was converted to the corresponding dicarbonamide using ammonia gas. In a second step, the dicarbonamide was converted to the corresponding dinitrile.

PFE-4: $CH_2=CHC(O)O-CF_2O(CF_2O)_{9-11}(CF_2CF_2O)_{9-11}CF_2OC(O)CH=CH_2$ 50 g perfluoroether diol (0.0257 mol) was charged in a 250 ml flask. 80 ml HFE 7200 was added followed by 5.36 g triethylamine (0.053 mol). 4.65 g acryloyl chloride (0.0514 mol) was slowly added at room temperature. The mixture was stirred overnight at room temperature. Afterwards the formed HCl salt was filtered of over Büchner filter. The solvent was removed by a Rotavap. 19F-NMR analysis revealed a complete conversion.

PFE-5: $I-CF_2O(CF_2CF_2O)_{5-14}-CF_2I$

A 1-liter 3-neck round bottom flask was charged with 650 g (0.68 mole), dimethyl ester of perfluoropolyethylene oxide from Exfluor Research Corporation of Austin, Tex. and 100 g of Fluoinert FC77 (3M) and stirred. A solution of 90 g, 1.6 mole KOH in 300 g water was added over 15 minutes and the mixture heated to 100° C. with a slight reflux for 30 minutes. The mixture was placed on a tray and dried in a vacuum oven to give a quantitative yield of 683 g perfluoropolyethylene oxide dipotassium acid salt. A 50% solids solution was made in water and acidified with concentrated $H_2SO_4$ extracted in FC77 filtered and solvent stripped to isolate 500 g (0.53 mol) perfluoropolyethylene oxide diacid. In a 1-liter 3-neck round bottom flask was charged with 500 g (0.53 mol) perfluoropolyethylene oxide diacid, 4 g DMF and 65 g (0.55 mol) thionyl chloride was added over 30 minutes and heated to 85° C. for 2 hours to give perfluoropolyethylene oxide diacid chloride. The perfluoropolyethylene oxide diacid chloride was stirred with 80 g (1.4 mol) KF and heated for 20 hours at 65° C. taken up in FC77 and filtered solvent stripped to give 306 g (0.32 mol) perfluoropolyethylene oxide diacid fluoride. A 1-liter 3-neck round bottom flask was charged with 300 g (0.32 mol) perfluoropolyethylene oxide diacid fluoride and 100 g, 0.74 mol LiI stirred and heated to 190° C. for 2 hours with off gassing. Reaction was followed by NMR to determine when the reaction was done. Added FC77 filtered through clay and solvent stripped to give 220 g (0.2 mol) PFE-5 diiodide. NMR confirmed the structure.

PFE-6: $I-CF(CF3)O-[CF2CF(CF3)O]4-8(C4F8O)-[CF(CF3)CF2O]-4-8CF(CF3)-I$

A 2-liter 3-neck round bottom flask was charged with 1000 g (0.7 mol) oligomer of hexafluoropropylene oxide diacid fluoride, made as described in U.S. Pat. No. 4,647,413 from the reaction of hexafluoropropylene oxide, perfluorosuccinyl fluoride and potassium fluoride in diglyme and 212 g (1.6 mol) of lithium iodide and heated to 190° C. for 2 hours with off gassing. Reaction was followed by NMR to determine when the reaction was done. Added FC77 filtered through clay and solvent stripped to give 967 g (0.61 mol) PFE-6 diiodide. NMR confirmed the structure.

Fluoropolymers
FP-1: E 20575: peroxide curable VF2-HFP copolymer, available from 3M
FP-2: PFE-90x: peroxide curable perfluoropolymer commercially available from 3M.
FP-3: LTFE 6400Z: peroxide curable fluoropolymer commercially available from 3M.

Co-Agents:
Luvomaxx TAIC DL 70: 70% triallyl-isocyanurate on silica carrier, available from Lehmann & Voss
Divinylperfluorohexane: available from Apollo Scientific Ltd.
Penta erytritol tetrabromide: available from Sigma Aldrich
Bis(4-aminophenyl)hexafluoropropane: available from Sigma Aldrich
Peroxide
Trigonox 101-50: organic peroxide, available from Akzo Nobel
Dicumyl peroxide: available from Akzo Nobel Additives
Nanogel™: available from Cabot Corporation
Carbofluor 2065: fluorinated carbon black, available from Advanced Research Co
ZnO: Adnan, nano particle zinc oxide, available from Evonik
SAF N110: available from Cabot Corp
MT N-99: Carbon black, available from Cancarb

EXAMPLES

Examples 1 to 3

In examples 1 to 3, curable fluoropolyether elastomer compositions, in the form of a paste, were made by mixing in a Hauschild™ Speedmixer (1 min at 2000 rpm, 1 min at 3500 rpm), fluoropolyether PFE-1, curing co-agent, peroxide and additives as given in table 1. The pastes were press cured in an Agila press (Agila PE 60 press from Agila NV, Ieper, Belgium, which is an example of a typical Rubber press with heated plates). Curing was carried out at 177° C. for 3 min and under a pressure of 20 bar.

TABLE 1 curable compositions (parts per 100 parts PFE)

| Compound | Ex 1 | Ex 2 | Ex 3 |
|---|---|---|---|
| PFE-1 | 100 | 100 | 100 |
| TAIC 70% | 16 | 10 | — |
| Divinylperfluorohexane | — | — | 16.09 |
| Trigonox 101-50 | — | 6 | 5 |
| Dicumylperoxide | 6 | — | — |
| NANOGEL | 8 | 8 | 8 |

The curable composition was tested for their curing behaviour and the cured fluoroelastomers were evaluated for their glass transition temperature (Tg) after press cure. The results are given in table 2.

TABLE 2

| | Ex 1 | Ex 2 | Ex 3 |
|---|---|---|---|
| cure time (min) | 30 | 2 | 30 |
| ML (in-lbs) | 0.29 | 0.64 | 0.43 |
| MH (in-lbs) | 54.26 | 24.26 | 7.57 |
| MH-ML (in-lbs) | 53.97 | 23.62 | 7.14 |
| Ts2 (min) | 0.27 | 0.19 | 0.98 |
| T 50 (min) | 0.36 | 0.31 | 1.17 |
| T 90 (min) | 0.44 | 0.37 | 3.46 |
| Tg press cured (° C.) | −110 | −113 | |

Example 4

In example 4, a paste was made by mixing 100 parts PFE-1, 8 parts TAIC, 5 parts Trigonox 101-50, 5 parts NANOGEL, 25 parts Carbofluor 2065 and 3 parts ZnO. The paste was press cured for 5 min at 177° C. under a pressure of 20 bar. The press cured fluoroelastomer was post cured in an oven during 16 hrs at 230° C. The curing behaviour of the curable composition and the properties of the cured and post cured fluoroelastomer are given in table 3.

TABLE 3

| Properties | Ex 4 |
|---|---|
| cure time (min) | 6 |
| ML (in-lbs) | 0.86 |
| MH (in-lbs) | 14.49 |
| MH-ML (in-lbs) | 13.63 |
| Ts02 (min) | 0.25 |
| T 50 (min) | 0.33 |
| T 90 (min) | 0.49 |
| Hardness Shore A (3") Post cured | 79 |
| Tensile Post cured (MPa) | 6.1 |
| Elongation Post cured (%) | 55 |
| Tg post cured (° C.) | −111 |

Examples 5 to 12

In examples 5 to 12, curable fluoroelastomer compositions, in the form of a paste, were made by mixing in a Hauschild™ Speedmixer (1 min at 2000 rpm, 1 min at 3500 rpm), fluoropolyether, curing co-agent, peroxide and additives as given in table 4. The pastes were press cured in an Agila press (Agila PE 60 press from Agila NV in Ieper, Belgium, which is an example of a typical Rubber press with heated plates). Curing was carried out at 177° C. for 3 min and under a pressure of 20 bar. The samples were tested for their rheological properties. The results are given in table 4.

Examples 13 to 16

In examples 13 to 16, curable compositions were prepared by first mixing the perfluoropolyether PFE-1 with NANOGEL (90/10). This mixture was blended with the compounds as indicated in table 5. The composition was thoroughly mixed on a roll mill. The compositions were then press cured at 177° C. during 7 min, followed by a post cure at 200° C. during 16 hours. The cured samples were tested for their cure and rheological properties. The results are also given in table 5.

TABLE 5

| | Ex 13 | Ex 14 | Ex 15 | Ex 16 |
|---|---|---|---|---|
| PFE-1 | 40.00 | 40.00 | 50.00 | 40.00 |
| FP-1 | 60.00 | — | — | 60.00 |
| FP-2 | — | 60.00 | — | — |
| FP-3 | — | — | 50.00 | — |
| NANOGEL | 2.50 | 2.50 | 2.50 | 2.50 |
| Cab O Sil T530 | 5.00 | 2.50 | 5.00 | 5.00 |
| MT N-990 | — | 15.00 | 20.00 | 25.00 |
| TAIC 70% | 8.00 | 6.00 | 6.00 | 8.00 |
| Trigonox 101-50D | 5.00 | 4.00 | 4.00 | 5.00 |
| FEF N-550 | — | — | 10.00 | — |
| ALPHA TECHNOLOGIES MDR @ 177° C. (6 min) | | | | |
| ML (inch·pounds) | 0.14 | 0.37 | 0.70 | 0.38 |
| MH (inch·pounds) | 22.60 | 22.83 | 29.35 | 42.64 |
| MH-ML (inch·pounds) | 22.46 | 22.46 | 28.65 | 42.26 |
| Tan d@ML | 1.357 | 1.054 | 0.814 | 1.684 |
| Tan d@MH | 0.082 | 0.146 | 0.084 | 0.154 |
| Ts2 (min.) | 0.39 | 0.39 | 0.35 | 0.32 |
| Tc50 (min.) | 0.53 | 0.49 | 0.44 | 0.43 |
| Tc90 (min.) | 0.94 | 0.73 | 0.73 | 0.95 |

TABLE 4

| | Ex 5 | Ex 6 | Ex 7 | Ex 8 | Ex 9 | Ex 10 | Ex 11 | Ex 12 |
|---|---|---|---|---|---|---|---|---|
| PFE-4 | 100 | — | — | — | — | — | — | — |
| PFE-5 | — | 100 | 100 | — | — | — | — | — |
| PFE-6 | — | — | — | 100 | 100 | — | — | — |
| PFE-2 | — | — | — | — | — | 100 | — | — |
| PFE-3 | — | — | — | — | — | — | 100 | 100 |
| TAIC 70% on silica | — | 8 | 8 | 8 | — | 12 | 12 | 12 |
| Trigonox 101-50 | 5 | 5 | 5 | 5 | 5 | 5 | — | — |
| Dicumylperoxide | — | — | — | — | — | — | 6 | 6 |
| Divinylperfluorohexane | — | — | — | — | 16 | — | — | — |
| Bis(4-aminophenyl)hexafluoropropane | — | — | — | — | — | — | — | 1 |
| Pentaerythritol tetrabromide (96%) | 10 | — | — | — | — | — | — | — |
| Nanogel | 8 | 8 | 5 | 8 | 8 | 9 | 8 | 8 |
| ZnO (Adnano) | 1 | — | 3 | — | — | 4 | — | — |
| MT N-990 | — | — | 10 | — | — | 10 | — | — |
| SAF N-110 | — | — | 15 | — | — | — | — | — |
| MDR @ 177° C. Curing time | 2 | 6 | 6 | 30 | 30 | 4 | 45 | 45 |
| ML | 0.66 | 0.5 | 0.41 | 0.78 | 0.56 | 0.49 | 0.03 | 0.05 |
| MH | 32.26 | 7.33 | 14.55 | 2.27 | 0.76 | 13.13 | 0.9 | 1.91 |
| MH − ML | 31.6 | 6.83 | 14.14 | 1.49 | 0.2 | 12.64 | 0.87 | 1.86 |
| tg D @ML | 0.652 | 0.66 | 1.171 | 0.641 | 0.536 | 0.531 | 1.667 | 1.2 |
| tg D @MH | 0.096 | 0.038 | 0.157 | 0.216 | 0.645 | 0.74 | 0.878 | 0.696 |
| Ts2 | 0.28 | 0.25 | 0.3 | | | 0.65 | | |
| T50 | 0.4 | 0.28 | 0.38 | 0.74 | 26.99 | 1.06 | 13.41 | 2.21 |
| T90 | 1 | 0.39 | 0.71 | 6.23 | 29.04 | 2.75 | 15.76 | 7.72 |
| Tg (MDSC) | −112 | −81.25 | −80.39 | | −55.2 | −115 | | |

TABLE 5-continued

|  | Ex 13 | Ex 14 | Ex 15 | Ex 16 |
|---|---|---|---|---|
| VULCANISATE PROPERTIES | | | | |
| Press cured 7 Min @ 177° C.—Post cured 16 HRS @ 230° C. | | | | |
| Hardness shore A(3") | 81 | | | 90 |
| Tensile (MPa) | 4.3 | | | 7.8 |
| Elongation (%) | 60 | | | 45 |
| MDSC : | | | | |
| Transition 1 (° C.) | −23.42 | −6.88 | −44.46 | −23.04 |
| Transition 2 (° C.) | −116.25 | −113.25 | −115.69 | −117.16 |

The invention claimed is:

1. A curable composition comprising
a) at least one functionalized fluoropolyether having a molecular weight from about 400 g/mole and up to about 25,000 g/mole represented by the formula:

$$XCF_2O(CF_2O)_w(C_2F_4O)_x(C_3F_6O)_zCF_2Y$$

wherein each of X and Y independently from each other is selected from a nitrile group or an alkylene nitrile group, wherein the alkylene nitrile group has an alkylene group containing from 1 to 10 carbon atoms;
wherein w, x, y and z are each independently from each other selected from an integer of from 0 to 30, with the proviso that w+x+y+z is at least 6;
b) a radical curing system comprising at least one radical generating compound;
c) further comprising at least one filler selected from silica containing material, and a carbon containing material or a combination thereof, the carbon containing material being selected from mesoporous carbon nanopowder, carbon nanotubes, carbon black, and modified graphite;
wherein the curable composition comprises at least 30% by weight based on the total amount of the curable composition of the functionalized fluoropolyethers.

2. The curable composition of claim 1 wherein the radical curing system furthermore comprises at least one coagent.

3. The curable composition of claim 1 which cures in a radical curing reaction to produce a composition furthermore comprising a fluorinated elastomer having a glass transition temperature of less than −40° C.

4. The curable composition according to claim 2 wherein the co-agent is selected from polyvinyl or polyallyl-containing compounds.

5. The curable composition according to claim 1 wherein the radical generating compound is a peroxide.

6. The curable composition according to claim 1 comprising at least 40% by weight based on the total amount of the composition of the functionalized fluoropolyether.

7. The curable composition according to claim 6 comprising at least 40% by weight based on the total amount of the curable composition of the functionalized fluoropolyether, and furthermore comprises at least one fluoropolymer having a glass transition temperature of less than 25° C. and that is curable in a radical curing reaction and has a molecular weight that is greater than that of the functionalized fluoropolyether.

8. A composition comprising a cured fluoroelastomer obtained by curing the curable composition of claim 1.

9. A method of making a composition comprising a fluoroelastomer having a glass transition temperature of less than −40° C., said method comprising
i. providing a curable composition according to claim 1 and
ii. subjecting the curable composition to a radical curing reaction.

10. A shaped article obtained by injection or compression molding the curable composition of claim 1.

* * * * *

UNITED STATES PATENT AND TRADEMARK OFFICE
CERTIFICATE OF CORRECTION

PATENT NO. : 9,902,836 B2
APPLICATION NO. : 14/009929
DATED : February 27, 2018
INVENTOR(S) : Corveleyn et al.

Page 1 of 1

It is certified that error appears in the above-identified patent and that said Letters Patent is hereby corrected as shown below:

In the Specification

Column 4
Line 41 (Approx.), Delete "polyethethers," and insert -- polyethers --, therefor.

Column 8
Line 54, Delete "difluororoethene," and insert -- difluoroethene, --, therefor.

Column 12
Line 25, Delete "Archema;" and insert -- Arkema; --, therefor.

Column 18
Line 43 (Approx.), Delete "(-CF$_2$)$_4$O-)" and insert -- (-(CF$_2$)$_4$O-) --, therefor.

Column 21
Line 26, Delete "Fluoinert" and insert -- Fluorinert --, therefor.
Line 52, Delete "CF2O]-4-8CF" and insert -- CF2O]4-8CF --, therefor.
Line 66, Delete "PFE-90×:" and insert -- PFE-90X: --, therefor.

Column 22
Line 8, Delete "erytritol" and insert -- erythritol --, therefor.
Line 19 (Approx.), Delete "Adnan," and insert -- Adnano, --, therefor.

Signed and Sealed this
Thirtieth Day of October, 2018

Andrei Iancu
*Director of the United States Patent and Trademark Office*